(12) United States Patent
Foster et al.

(10) Patent No.: US 7,790,796 B2
(45) Date of Patent: Sep. 7, 2010

(54) SPACKLING COMPOSITION CONTAINING POLYARAMID FIBERS AND CERAMIC MICROPARTICLES, AND METHODS OF REPAIR AND ATTACHMENT

(75) Inventors: Van R. Foster, Westerville, OH (US); Andrew P. Bonifas, Kalida, OH (US)

(73) Assignee: Elmer's Products Inc., Columbus, OH (US)

( * ) Notice: Subject to any disclaimer, the term of this patent is extended or adjusted under 35 U.S.C. 154(b) by 945 days.

(21) Appl. No.: 11/268,437

(22) Filed: Nov. 7, 2005

(65) Prior Publication Data

US 2006/0096074 A1 May 11, 2006

Related U.S. Application Data

(60) Provisional application No. 60/625,860, filed on Nov. 8, 2004.

(51) Int. Cl.
*C08K 5/01* (2006.01)
*C08K 5/17* (2006.01)
*G02B 6/44* (2006.01)
*C08F 36/18* (2006.01)
*C08K 3/26* (2006.01)
*C09D 17/00* (2006.01)

(52) U.S. Cl. .................. 524/486; 524/484; 524/722; 524/219; 524/425

(58) Field of Classification Search ............ 106/436, 106/657, 638, 712, 802; 524/291, 219, 425, 524/484, 486, 722; 442/169
See application file for complete search history.

(56) References Cited

U.S. PATENT DOCUMENTS

| 5,258,069 A * | 11/1993 | Knechtel et al. ....... 106/287.24 |
| 6,402,832 B1 * | 6/2002 | Vijayendran et al. ........ 106/778 |
| 6,531,528 B1 * | 3/2003 | Kurp .......................... 524/291 |
| 6,547,870 B1 * | 4/2003 | Griessmann et al. ........ 106/417 |
| 6,602,935 B2 * | 8/2003 | Prat et al. ................... 523/334 |
| 2003/0119948 A1 * | 6/2003 | Kelly et al. .................... 524/35 |
| 2003/0188667 A1 * | 10/2003 | Beard et al. ................. 106/644 |

* cited by examiner

*Primary Examiner*—Jerry Lorengo
*Assistant Examiner*—Noah S Wiese
(74) *Attorney, Agent, or Firm*—McNees Wallace & Nurick, LLC

(57) ABSTRACT

A spackling compound is provided that is easy to apply smoothly, can be applied in thicker layers than known spackling without cracking upon drying, and can be modified after drying without pitting, flaking, or crumbling, particularly at the edges of the applied spackling patch. The composition includes polyaramid fibers that act as structural strengtheners to provide the dried composition with exceptional strength and resistance to cracking. In a second embodiment, the composition further includes low aspect ratio (about equal to 1) ceramic microparticles that fill voids in the mixture to produce a smoother, more dense composition. Upon drying, the ceramic microparticles produce a very smooth surface that can be sanded without flaking or crumbling. Additionally, the invention provides methods of preparing and using the compositions to produce smooth repair patches with no cracks, are easy to sand without pitting or flaking, and to provide improved structural integrity to the repaired area.

11 Claims, No Drawings

SPACKLING COMPOSITION CONTAINING POLYARAMID FIBERS AND CERAMIC MICROPARTICLES, AND METHODS OF REPAIR AND ATTACHMENT

CROSS-REFERENCE TO RELATED APPLICATIONS

This application claims priority to U.S. Provisional Patent Application Ser. No. 60/625,860 filed Nov. 8, 2004, incorporated herein by reference.

FIELD OF THE INVENTION

The present invention is directed to spackling compositions, and to methods of applying the compositions to repair building materials.

BACKGROUND OF THE INVENTION

The present invention relates generally to improvements in constructing and making repairs to gypsum wallboard interior walls and ceilings of buildings. In the case of construction, it is well known to use gypsum wallboard to form interior walls. In the case of repair, where there may be imperfections, damage, etc. to the gypsum wallboard, it is necessary to use spackling to fill the crack, and where any superficial damage occurs to the wallboard, it is known to use spackling to fill the damage to affect a repair.

Known spackling can be of many application types and densities, depending upon the desired application and environment. For example, "lightweight" spackle contains a high percentage of lightweight extenders and has an airy, almost powdery texture. Lightweight spackle dries quickly—however, it is suitable only for relatively minor repairs occupying a relatively small surface area of the drywall, such as small nail holes and very shallow scratches. In contrast, "heavy duty" spackling has a higher percentage of fillers such as calcium carbonate making the product very dense. Such products typically have a thick, putty-like texture. Heavy-duty spackling is suitable for covering nails and drywall screw holes, and for filling significant depressions and holes in wallboard.

There are numerous problems associated with known spackling. In the case of lightweight spackling, although it is smooth and relatively easy to apply to gypsum wallboard, it is very soft upon drying and lacks structural strength. In the case of heavy-duty spackling, it can be difficult to smooth due to its heavy texture and paste-like consistency. Additionally, known heavy-duty spackling takes a significant period of time to dry, and must be applied in very thin layers to avoid cracking and shrinkage. It is believed that the cracking seen in heavy-duty spackling is attributable to the loss of significant volume of the spackle as water and other fluids evaporate. Lastly, known spackling does not produce a dried product capable of having good structural strength. Lightweight spackles are generally too soft upon drying and heavy-duty spackles are too hard to accept mechanical fasteners consistently.

Therefore, what is needed is a spackling compound that is easy to apply smoothly, can be applied in thicker layers than known spackling without cracking upon drying. Lastly, there is a need for a spackling compound that includes ingredients that dry to produce a structurally reinforced repair that is suitable for post-drying modifications.

Additionally, there is a need for improved methods of effecting repairs to wallboard and plaster walls that are easy to practice, produce smooth patches with no cracks, are easy to sand without pitting or flaking, and to provide improved structural integrity to the repaired area.

SUMMARY OF THE INVENTION

The present invention provides a patch repair composition for use on wallboard and plaster walls and ceilings, the composition comprising resin binder, pigment, and polyaramid fibers. In one embodiment, the composition includes fibers in an amount of from about 0.05 to about 10 percent by weight. In another embodiment, the patch repair composition optionally further comprises up to 10 percent by weight thickener. In another embodiment, the composition further optionally further comprises up to 10 percent by weight freeze thaw agent. In yet another embodiment, the composition includes a biocide. In still another embodiment, the composition includes a surfactant.

In another embodiment, the present invention provides a patch repair composition for use on wallboard and plaster walls and ceilings, the composition comprising resin binder, pigment, polyaramid fibers, and ceramic microparticles. In one embodiment, the composition includes fibers in an amount of from about 0.05 to about 10 percent by weight. In another embodiment, the patch repair composition optionally further comprises up to about 10 weight percent thickener. In another embodiment, the composition further optionally further comprises up to about 10 weight percent freeze thaw agent. In yet another embodiment, the composition includes a biocide. In still another embodiment, the composition includes a surfactant.

The invention further includes methods of preparing patch repair compositions for application to interior walls of a building in a manner that adds improved structural integrity to the repaired area. In one embodiment, a method is provided for preparing a patch repair composition comprising resin binder, pigment, fibers, and optionally ceramic microparticles, the method comprising the steps of preparing a mixture comprising at least one resin binder, at least one pigment, fibers and ceramic microparticles, the fibers having an average length before mixing; and mixing so as to substantially reduce the average length of the fibers and to provide a substantially homogeneous mixture.

In another embodiment, the included polyaramid fibers are present in an amount of from about 0.05 to about 10 percent by weight, and the ceramic microparticles are present in an amount of from about 5 to about 20 percent by weight.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

There are no drawing figures submitted with this patent application, as none are necessary to enable the invention or its practice.

DETAILED DESCRIPTION OF THE INVENTION

Spackling Compositions with Fibers. The present invention provides compositions for effecting patch repairs of interior walls and ceilings. The invention is applicable to repair of cracks, depressions, holes, scratches, joints, nail holes, screw holes, and any other type of undesirable surface feature of a wall or ceiling. Because the compositions of the present invention include fibrous components, the dried repair composition exhibits improved structural strength, resistance to cracking, and decreased flaking and pitting upon sanding, drilling, nailing or other post-drying processing.

In one embodiment, the preferred patch repair composition comprises resin binder, pigment, water, and fibers. Most preferably, the composition includes from about 1 to about 50 percent by weight resin binder, from about 1 to about 80 percent by weight pigment, from about 10 to about 50 percent by weight water, and from about 0.05 to about 5 percent by weight fibers.

The resin binder can be any known binder suitable for spackling compositions. Preferably, the binder comprises vinyl acrylic, acrylic, vinyl acetate, styrene acrylic, or combinations thereof. An exemplary binder is that vinyl acrylic emulsion binder marketed as PD-0110 by HB Fuller Company of St. Paul, Minn. However, other binders known for use by those skilled in the art of spackling, caulking, and painting are within the scope of the invention.

The pigment can be any known pigment suitable for spackling compositions. Preferably, the pigment comprises $TiO_2$, $CaCO_3$, talc and combinations thereof. Examples of a suitable calcium carbonate would be that marketed as SW12 by Omya Canada, Inc. of Perth, Ontario, Canada. An example of a suitable talc would be that marketed as Vertal 7 by Luzenac America, USA. More preferably, the pigment includes a pigment that is a lightweight extender, such as that polyethylene/calcium carbonate lightweight extender marketed as Dualite 7000 by Pierce & Stevens Corp., a Division of Sovereign Specialty Chemicals. It is believed that the inclusion of a lightweight extender provides dried film flexibility so the dried composition is resilient and can resist impact chipping and cracking when the composition is fully dried. However, other pigments known for use by those skilled in the art of spackling, caulking, and painting are within the scope of the invention.

The fibers are preferably present in an amount of from about 0.05 to about 10 percent by weight of the composition, and more preferably between about 1 to about 5 percent by weight before applying the composition to a surface and allowing it to dry. Suitable fibers are comprised of polyaramid, polyethylene, and combinations thereof. However, other fibers, preferably synthetic fibers, can also be utilized. Most preferably, the fibers are polyaramid. In particular, polyaramid fibers have been found by the inventors to be readily wettable and otherwise modified to render a homogeneous mixture upon wetting and mixing, rendering a surprisingly smooth and workable composition that dries to provide a particularly strong and shrink-resistant repair patch. Additionally, polyaramid fibers combined with a resilient pigment and vinyl acrylic polymer binder produce a composition that, when applied to drywall to render a repair, produces a dried repair patch that is resistant to chipping and that can be nailed, drilled, and otherwise worked without cracking.

In another embodiment, the preferred patch repair composition optionally includes up to about 10 percent by weight of thickener. The thickener can be any thickener known to those skilled in the art, but is preferably cellulosic, such as the cellulose carboxymethyl ether thickener marketed as CMC by DOW Chemical Company.

In still another embodiment, the preferred patch repair composition includes a surfactant. The surfactant can be any surfactant known for use in spackling and caulking compositions, but is preferably that alkylphenyl polyether alcohol surfactant marketed as Triton X405 by Rohm & Haas. More preferably, the surfactant comprises up to about 5 percent by weight of the composition. Most preferably, the surfactant comprises between about 0.35 to about 0.70 percent by weight of the composition.

In still another embodiment, the preferred patch repair composition additionally comprises at least one biocide. The biocide can be any known biocide, but is preferably that biocide marketed as Acticide LA by ActiChem, Inc. Preferably, the biocide is included having a content range of between about 0.05 to about 2 percent by weight, and more preferably between about 0.05 to about 0.15 percent by weight.

In still another embodiment, the preferred patch repair composition additionally comprises at least one freeze-thaw agent, preferably propylene glycol such as that commercially available from Dow Chemical Company. Preferably, the freeze-thaw agent comprises between about 0.5 to about 2 percent by weight of the composition.

In still another embodiment, the preferred patch repair composition additionally comprises at least one defoamer. Defoamers can be any known to those skilled in the art, and without limitation may include that marketed as Nopco NXZ by Henkel KGaA, Dusseldorf, Germany. Preferably, the defoamer is included having a content range of between about 0.1 to about 2 percent by weight.

In still another embodiment, the preferred patch repair composition additionally comprises at least one filler. Fillers can be any known to those skilled in the art, and without limitation may include calcium carbonate, for example. Preferably, the filler is included having a content range of between about 20 to about 60 percent by weight.

Accordingly, a preferred composition comprises up to about 10 percent by weight of a surfactant, up to about 10 percent by weight thickener, up to about 10 percent by weight freeze thaw agent, about 1 to about 50 percent by weight binder, about 1 to about 80 percent by weight pigment, about 10 percent to about 50 percent by weight water, up to about 80 percent by weight filler, and from about 0.05 to about 10 percent by weight polyaramid fibers, from about 0.05 to about 2 weight percent biocide, with the foregoing percentages adding up to 100 weight percent.

Spackling Compositions with Polyaramid Fibers and Ceramic Microparticles. In a second preferred embodiment, the patch repair composition comprises resin binder, pigment, polyaramid fibers, and ceramic microparticles. The resin binder, pigment, and fibers can be any of those previously discussed herein, or others known to those skilled in the art. The ceramic microparticles can be comprised of any ceramic, composite, or refractory material such as ceramic or glass materials including alumina, zirconia, hafnia, magnesia, titanium, calcium, silica, yttria, other refractory ceramic materials, and combinations thereof. Preferably, the ceramic microparticles are glass, alumina, zirconia, calcium, silica, and combinations thereof. The ceramic microparticles can be of any three-dimensional geometry, but preferably include at least one exposed rounded outer surface. Most preferably, the ceramic microparticles have a low aspect ratio, preferably substantially spherical (aspect ratio is about 1), such as ceramic microspheres marketed as Kish SLG by PQ, Inc. Preferably, the microparticles have an average particle size of less than 900 microns. More preferably, the microparticles have an average particle size of less than about 500 microns. Most preferably, the microparticles have an average particle size of between about 100 to about 400 microns.

The preferred fiber-ceramic embodiment of the patch repair composition comprises up to two weight percent thickener, wherein the thickener is a cellulose or cellulose derivative, between about 1 to about 50 weight percent resin binder, between about 1 to about 80 weight percent pigment, between about 10 to about 50 weight percent water, from about 0.05 to about 10 weight percent polyaramid fibers, from about 5 to about 20 weight percent ceramic microparticles, from about 0.05 to about 2 weight percent biocide, with the foregoing percentages adding up to 100 weight percent.

In still another embodiment, the second preferred patch repair composition additionally comprises at least one biocide. More preferably, the biocide is included having a content range of between about 0.05 to about 0.15 percent of the total composition by weight.

In still another embodiment, the preferred patch repair composition additionally comprises at least one surfactant. Preferably, the surfactant agent is included having a content range of between about 0.35 to about 1 percent by weight. Preferably, the surfactant is that nonionic alkylphenyl polyether alcohol marketed as Triton X405 by Dow Chemical Company.

In still another embodiment, the preferred patch repair composition additionally comprises at least one freeze-thaw agent. Preferably, the freeze-thaw agent is included having a content range of between about 0.5 to about 2 percent by weight. More preferably, the freeze-thaw agent is propylene glycol such as that marketed by Dow Chemical Company.

In still another embodiment, the second preferred patch repair composition additionally comprises at least one filler. Preferably, the filler is included having a content range of between about 20 to about 60 percent by weight. More preferably, the filler includes calcium carbonate.

Accordingly, a second embodiment of the fiber-ceramic patch composition comprises from 1 to about 50 weight percent resin binder, from 1 to about 80 weight percent pigment, about from 10 to about 50 percent by weight water, about 1 to about 80 weight percent filler, from 0.05 to about 10 weight percent polyaramid fibers; up to 10 weight percent surfactant, up to 10 weight percent thickener, up to 10 weight percent freeze-thaw agent, from about 0.05 to about 2 weight percent biocide, and about 5 to about 20 weight percent ceramic microparticles, with the foregoing percentages collectively adding up to 100 weight percent.

Additionally, it is believed that the methods used to prepare spackling compositions of the present invention having polyaramid and/or polyethylene fibers provide the composition with novel properties. For example, it is believed that in preparing compositions that include polyaramid fibers and ceramic microparticles, upon mixing the microparticles tear and otherwise modify the wetted polyaramid fibers to render a smoother and more homogeneous spackling composition than one without ceramic microparticles. It is further believed that providing sufficient water or other solvent, combined with adequate mixing, shortens the polyaramid fibers, whether by swelling, shearing, tearing, roughening, or other surface modification of the fibers.

Examples

The following tables are illustrative, but not limiting, of spackling compositions of the present invention:

TABLE 1

| Ingredient | lb/Gal | Weight % (Range) |
|---|---|---|
| Vinyl acrylic binder (PD110) | 8.420 | 10-25 |
| Water | 8.333 | 15-25 |
| Biocide (Acticide LA) | 8.428 | 0.01-2.0 |

TABLE 1-continued

| Ingredient | lb/Gal | Weight % (Range) |
|---|---|---|
| Surfactant (Triton X405) | 8.428 | 0.01-2.0 |
| Polyaramid fibers (Kevlar) | 6.676 | 0.01-2.0 |
| Ceramic microspheres (Kish SLG) | 5.842 | 10-20 |
| Cellulosic thickener (CMC) | 6.843 | 0.01-2.0 |
| Defoamer (Nopco NXZ) | 8.837 | 0.01-2.0 |
| Extender (Dualite 7000 polyethylene/CaCO$_3$ lightweight extender | 0.542 | 0.01-5.0 |
| Calcium carbonate filler (SW-12) | 15.021 | 30-70 |
| Glass beads (K-20) | 1.669 | 2-20 |
| Pigment (TiO2) | 33.750 | 0.01-2.0 |
| Freeze-thaw agent (propylene glycol) | 8.828 | 0.01-2.00 |
| TOTALS | 121.617 | 100% |
| DENSITY | 6.5-9.5 lb/gal | |

TABLE 2

| Ingredient | Lb/Gal | Weight % (Range) |
|---|---|---|
| Vinyl acrylic binder (PD110) | 8.420 | 15-20 |
| Water | 8.333 | 17-20 |
| Biocide (Acticide LA) | 8.428 | 0.01-0.2 |
| Surfactant (Triton X405) | 8.428 | 0.01-0.2 |
| Polyaramid fibers (Kevlar) | 6.676 | 0.01-0.2 |
| Ceramic microspheres (Kish SLG) | 5.842 | 12-18 |
| Cellulosic thickener (CMC) | 6.843 | 0.01-0.5 |
| Defoamer (Nopco NXZ) | 8.837 | 0.01-0.2 |
| Extender (Dualite 7000 polyethylene/CaCO$_3$ lightweight extender | 0.542 | 0.5-1.5 |
| Calcium carbonate filler (SW-12) | 15.021 | 30-70 |
| Glass beads (K-20) | 1.669 | 2-10 |
| Pigment (TiO2) | 33.750 | 0.01-1.0 |
| Freeze-thaw agent (Propylene Glycol) | 8.828 | 0.01-1.0 |
| TOTALS | 121.617 | 100% |
| DENSITY | 6.5-9.5 lb/gal | |

The above tables are exemplary, and are not limiting. Other combinations and variations of ingredients and amounts are within the scope of the invention.

Exemplary Methods of Manufacture and Use of the Composition. The present invention includes methods of preparing the spackling compositions. In a first preferred embodiment, the method comprises the step of providing polyaramid fibers and combining them with the resin binder, surfactant, defoamer, propylene glycol, biocide and water. The resulting slurry is mixed using a sweep blade with a speed of 20-75 rpm and using a high speed mixing blade at approximately 1400-1700 rpm for between about 20 to about 40 minutes, or until the fibers are substantially wetted out. The pigments, preferably including TiO2, CaCO$_3$, and the thickener are next added and mixed using high speed mixing with a sweep blade until the slurry is homogeneous. The high-speed disperser is turned off and the ceramic microspheres are mixed into the slurry using the sweep blade for between about 20 to about 40 minutes. The lightweight extender and other pigments, glass beads, and any other remaining ingredients are then added and the composition is mixed between approximately 5 minutes to approximately 10 minutes at 20-75 rpm until the composition is substantially homogeneous. Preferably mixing is performed using a mixer capable of providing high shear to the mixture and with a sweep blade such as a Meyers or Ross Versamixer mixer. It is to be understood that the suggested mixing speeds and times can be varied based upon batch size, weight percent of ingredients, desired consistency, and other factors known to those skilled in the art.

Importantly, upon wetting and mixing, the polyaramid fibers of a preselected average length become modified, such as by roughening, tearing, shearing, swelling, or otherwise, and become evenly dispersed in the composition mixture. The modified fibers provide a fibrous internal structural element that holds the composition together in its wetted form and that becomes a cohesive structural element after application of the composition to a surface to be repaired and drying. After application of the composition to a surface such as a wallboard surface, the composition dries to form a matrix including the polyaramid fibers that function as internal structural strengthener to provide the dried composition with increased resistance to shrinking, cracking, pitting, and flaking.

Additionally, it has been found that the inclusion of ceramic microparticles, and particularly particles having a low aspect ratio substantially rounded surface geometry, such as microspheres, microtubes, or microcylinders provides the composition with unique and improved physical properties as compared to known spackling compositions. For example, the exemplary compositions of Example 1 and Example 2 having microspheres produce a spackling having a texture that is more smooth and fluid than spackling compositions having no microparticles. When used in combination with polyaramid fibers, the composition having microspheres is surprisingly easy to apply and smooth using traditional spackling tools, without incurring undesirable lifting or separation of the putty from the wall as the putty blade travels, or other undesirable side effects of known spackling compositions. Upon application of the composition, the microparticles fill voids in the composition, such as voids between fibers and other particles, to produce a more solid matrix upon drying. Post-drying, the ceramic microparticles are believed to yield a smoother and more durable surface upon sanding, and also impart superior resistance to chipping and flaking, including at the edges of the repair patch. It is also felt that the inclusion of ceramic microparticles, and particularly microspheres also improves paint retention, making the composition easier to paint over.

The present invention further provides methods of preparing a patch repair composition comprising resin binder, pigment, polyaramid fibers and ceramic microspheres. The method comprises the steps of preparing a mixture comprising at least one resin binder, at least one pigment, polyaramid fibers and ceramic microspheres, said polyaramid fibers having a preselected average length; mixing or stirring said mixture so as to substantially reduce the said average length of said polyaramid fibers and obtain a substantially homogeneous mixture.

The present invention further includes methods of treating imperfections existing in building member surfaces. In one embodiment, the methods comprise the steps of: (a) applying to said surface an amount effective for the purpose of a patch repair composition comprising, resin binder, pigment, and polyaramid fibers; and (b) allowing said composition to dry. In a second embodiment, the method provided for treating imperfections existing in building member surfaces comprises: (a) applying to said surface an amount effective for the purpose of a patch repair composition comprising, resin binder, pigment, polyaramid fibers and ceramic microparticles; and (b) allowing said composition to dry.

The present invention further provides for attaching a fastener to a building member surface, the surface having an imperfection requiring application of a repair composition. The attachment methods utilize the compositions previously described herein. The first preferred method includes the step of applying to said surface an amount effective for the purpose of repairing said imperfection a composition comprising, resin binder, pigment, and fibers, preferably polyaramid fibers. The first preferred method further includes the step of allowing said composition to dry to form a solid portion. The method includes the step of placing a fastener into the solid portion. The presence of polyaramid fibers in the repaired solid portion renders the solid portion uniquely suited for post-repair modifications such as drilling and attaching. Known spackling compounds are not suited for such high-stress post-drying modifications since there is no internal matrix of structural members. Known spackling compositions crack, crumble, chip, and otherwise deteriorate if drilled or nailed after drying.

In a second embodiment of attachment methods, the composition, which includes fibers and ceramic microparticles, can be used to treat and repair imperfections existing in building member surfaces. To effect such repairs, the repair methods include the steps of applying to said surface an amount effective for the purpose of a patch repair composition comprising, resin binder, pigment, fibers and ceramic microparticles; and allowing the composition to dry. The dried repair composition can be worked such as by sanding, and can also be modified such as by drilling and/or nailing, without adversely impacting the repair patch or repaired area.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spackling composition, comprising:
   (a) a polymer binder, wherein the polymer binder further includes vinyl acrylic, acrylic, vinyl acetate, styrene acrylic, or combinations thereof;
   (b) a pigment, wherein the pigment further includes an extender, and wherein the extender confers flexibility and resilience to the spackling composition for resisting impact chipping and cracking;
   (c) polyaramid fibers;
   (d) ceramic microparticles, wherein the ceramic microparticles are alumina, zirconia, hafnia, magnesia, titanium, calcium, silica, or yttria; and
   (e) water.

2. A spackling composition according to claim 1, wherein the polyaramid fibers are present in an amount of from about 0.05 to about 10 weight percent.

3. A spackling composition according to claim 1, wherein the composition further includes between about 0.1 to about 10 weight percent thickener, between about 1 to about 50 weight percent polymer binder, between about 1 to about 80 weight percent pigment, between about 10 to about 50 weight percent water, and from about 0.05 to about 10 weight percent polyaramid fibers.

4. A spackling composition according to claim 1, additionally comprising at least one of glass beads, a biocide, a surfactant, a freeze-thaw agent, and a filler.

5. A spackling composition according to claim 4, the composition further comprising between about 0.01 to about 5 weight percent surfactant, between about 0.1 to about 10 weight percent freeze thaw agent, between about 0.1 to about 80 weight percent filler, and between about 2 to about 20 weight percent glass beads.

6. A spackling composition according to claim 1, wherein the fibers are present in an amount from about 0.05 to about 10 weight percent, and wherein the ceramic microparticles are present in an amount from about 5 to about 20 weight percent.

7. A spackling composition according to claim 4, the composition further comprising between about 2 and about 20 weight percent glass beads, between about 0.01 to about 2 weight percent biocide, between about 0.01 to about 5 weight percent surfactant, between about 0.1 to about 2 weight percent freeze-thaw agent, and about 0.1 to about 80 weight percent filler.

8. A spackling composition for use in repairing damaged surfaces, wherein the spackling composition is a substantially homogeneous mixture comprising:
 (a) a polymer binder, wherein the polymer binder further includes vinyl acrylic, acrylic, vinyl acetate, styrene acrylic, or combinations thereof;
 (b) an extender, wherein the extender confers flexibility and resilience to the spackling composition;
 (c) polyaramid fibers of a preselected average length, wherein the polyaramid fibers act as structural strengtheners to the spackling composition;
 (d) ceramic microparticles, wherein the ceramic microparticles further include a substantially rounded surface geometry, and wherein the substantially rounded surface geometry confers a smooth and fluid texture to the spackling composition, and wherein the ceramic microparticles are alumina, zirconia, hafnia, magnesia, titanium, calcium, silica, or yttria;
 (e) water; and
 (f) wherein, following application and drying the spackling composition provides a smooth, sandable, shrink and crack resistant repaired surface, and wherein the repaired surface provides a suitable substrate for a fastener.

9. The spackling composition of claim 8, wherein the extender comprises a polyethylene calcium carbonate.

10. The spackling composition of claim 1, wherein the ceramic microparticles further comprise mixtures of alumina, zirconia, hafnia, magnesia, titanium, calcium, silica, and yttria.

11. The spackling composition of claim 8, wherein the ceramic microparticles further comprise mixtures of alumina, zirconia, hafnia, magnesia, titanium, calcium, silica, and yttria.

* * * * *